(12) United States Patent
Elowe et al.

(10) Patent No.: US 9,963,648 B2
(45) Date of Patent: *May 8, 2018

(54) PROCESS FOR THE PREPARATION OF BRANCHED POLYOLEFINS FOR LUBRICANT APPLICATIONS

(71) Applicant: DOW GLOBAL TECHNOLOGIES LLC, Midland, MI (US)

(72) Inventors: Paul R. Elowe, Midland, MI (US); Wanglin Yu, Pearland, TX (US); Brad C. Bailey, Midland, MI (US); Daniel J. Arriola, Midland, MI (US); Jerzy J. Klosin, Midland, MI (US); Suh Joon Han, Schwenksville, PA (US); Zenon Lysenko, Midland, MI (US); Martin R. Greaves, Baar (CH)

(73) Assignee: Dow Global Technologies LLC, Midland, MI (US)

( * ) Notice: Subject to any disclaimer, the term of this patent is extended or adjusted under 35 U.S.C. 154(b) by 65 days.

This patent is subject to a terminal disclaimer.

(21) Appl. No.: 14/901,059

(22) PCT Filed: Jun. 18, 2014

(86) PCT No.: PCT/US2014/042890
§ 371 (c)(1),
(2) Date: Dec. 27, 2015

(87) PCT Pub. No.: WO2014/209712
PCT Pub. Date: Dec. 31, 2014

(65) Prior Publication Data
US 2016/0152903 A1    Jun. 2, 2016

Related U.S. Application Data
(60) Provisional application No. 61/840,770, filed on Jun. 28, 2013.

(51) Int. Cl.
*C10G 69/12* (2006.01)
*B01J 31/22* (2006.01)
(Continued)

(52) U.S. Cl.
CPC ........ *C10G 69/126* (2013.01); *B01J 31/2239* (2013.01); *C10G 50/02* (2013.01);
(Continued)

(58) Field of Classification Search
CPC ................ C07C 2/08; C07C 2/22; C07C 2/34
(Continued)

(56) References Cited

U.S. PATENT DOCUMENTS 4,892,851 A    1/1990   Ewen et al.
5,017,714 A    5/1991   Welborn, Jr.
(Continued)

FOREIGN PATENT DOCUMENTS

EP    0119070    9/1984
EP    0577581    1/1994
(Continued)

OTHER PUBLICATIONS

Pavone, "Exxonmobil's Ultra High Viscosity Index Poly Alpha Olefin Lubricant Blend Stock" ; PEP Review 2010-2, (Apr. 2010) (82 pgs).
(Continued)

*Primary Examiner* — Ellen M McAvoy
(74) *Attorney, Agent, or Firm* — Brooks, Cameron & Huebsch, PLLC

(57) ABSTRACT

Processes to prepare branched polyolefins for lubricant applications comprise combining at least one olefin and a coordination-insertion catalyst under conditions such that at least one oligomer product is formed. Low molecular weight
(Continued)

(formula IV)

by-products are fractionated out and the oligomer product is converted to a saturated hydrocarbon via hydrogenation.

11 Claims, 3 Drawing Sheets

(51) Int. Cl.
| | |
|---|---|
| *C10M 107/04* | (2006.01) |
| *C10G 50/02* | (2006.01) |
| *C10M 177/00* | (2006.01) |
| *C10M 107/08* | (2006.01) |
| *C10M 107/10* | (2006.01) |
| *C10M 105/04* | (2006.01) |

(52) U.S. Cl.
CPC ........ *C10M 105/04* (2013.01); *C10M 107/04* (2013.01); *C10M 107/08* (2013.01); *C10M 107/10* (2013.01); *C10M 177/00* (2013.01); *B01J 2231/20* (2013.01); *B01J 2531/46* (2013.01); *B01J 2531/48* (2013.01); *B01J 2531/49* (2013.01); *C10G 2300/1088* (2013.01); *C10G 2400/10* (2013.01); *C10M 2205/0225* (2013.01); *C10M 2205/0265* (2013.01); *C10M 2205/0285* (2013.01); *C10N 2220/022* (2013.01); *C10N 2220/028* (2013.01); *C10N 2230/02* (2013.01); *C10N 2230/08* (2013.01); *C10N 2260/02* (2013.01)

(58) Field of Classification Search
USPC ...................................... 585/16, 17, 18, 255
See application file for complete search history.

(56) References Cited

U.S. PATENT DOCUMENTS

| | | | |
|---|---|---|---|
| 5,132,281 A | 7/1992 | Chevallier et al. | |
| 5,155,080 A | 10/1992 | Ewen et al. | |
| 5,278,264 A | 1/1994 | Spaleck et al. | |
| 5,296,434 A | 3/1994 | Eberhard et al. | |
| 5,318,935 A | 6/1994 | Canich et al. | |
| 5,969,070 A | 10/1999 | Waymouth et al. | |
| 6,376,409 B1 | 4/2002 | Burkhardt et al. | |
| 6,376,412 B1 | 4/2002 | Burkhardt et al. | |
| 6,380,120 B1 | 4/2002 | Burkhardt et al. | |
| 7,060,848 B2* | 6/2006 | Boussie ................ | B01J 31/223 556/21 |
| 7,091,292 B2* | 8/2006 | Boussie ................ | C08F 10/00 502/162 |
| 7,414,006 B2* | 8/2008 | McConville ......... | B01J 31/1815 502/103 |
| 7,687,442 B2* | 3/2010 | Walton ................. | C10M 107/10 508/110 |
| 8,003,839 B2* | 8/2011 | Buchanan ............. | C07C 2/32 585/310 |
| 8,609,794 B2* | 12/2013 | Klosin ................... | C08F 10/00 502/103 |
| 8,865,959 B2* | 10/2014 | Patil ....................... | C07C 2/22 585/502 |
| 9,643,900 B2* | 5/2017 | Arriola .................. | C07C 2/34 556/51 |
| 2001/0041818 A1 | 11/2001 | Bagheri et al. | |
| 2006/0199744 A1 | 9/2006 | Walton et al. | |
| 2011/0054233 A1* | 3/2011 | Mousa ................... | B01J 19/18 585/522 |
| 2011/0282018 A1 | 11/2011 | Klosin et al. | |
| 2016/0122259 A1* | 5/2016 | Arriola .................. | C07C 2/34 568/420 |

FOREIGN PATENT DOCUMENTS

| | | |
|---|---|---|
| EP | 0578838 | 1/1994 |
| WO | 9319103 | 9/1993 |
| WO | 9907788 | 2/1999 |
| WO | 9929743 | 6/1999 |
| WO | 0148034 | 7/2001 |
| WO | 2012134688 | 10/2012 |

OTHER PUBLICATIONS

International Search Report and Written Opinion for related PCT Application PCT/US14/42890, dated Oct. 9, 2014 (11 pgs).
Braunschweig, et al., "Constrained geometry complexes—Synthesis and applications", Coordination Chemistry Reviews 250 (2006) 2691-2720 (30 pgs).
Stehling, et al. "ansa-Zirconocene Polymerization Catalysts with Annelated Ring Ligands—Effects on Catalytic Activity and Polymer Chain Length" Organometallics 1994,13, 964-970 (7 pgs).
Giorgio Soave, "Equilibrium constants from a modified Redlich-Kwong equation of state", Chemical Engineering Science, 1972, vol. 27, pp. 1197-1203 (7 pgs).
Spaleck, et al., "The Influence of Aromatic Substituents on the Polymerization Behavior of Bridged Zirconocene Catalysts" Organometallics 1994,13, 954-963 (10 pgs).

* cited by examiner (formula IV)

formula (V)

formula (VI)

formula (VII)

formula (VIII)

formula (IX)

formula (X)

US 9,963,648 B2

PROCESS FOR THE PREPARATION OF BRANCHED POLYOLEFINS FOR LUBRICANT APPLICATIONS

CROSS REFERENCE TO RELATED APPLICATION

This application claims priority to International Patent Application No. PCT/US2014/042890, filed Jun. 18, 2014, which claims priority to U.S. Provisional Application No. 61/840,770, filed Jun. 28, 2013, all of which are hereby incorporated herein by reference in their entireties.

FIELD

The invention relates to processes for the manufacture of a branched polyolefin and corresponding saturated hydrocarbons, and their application as lubricants.

BACKGROUND

One type of commercial lubricant is a polyalphaolefin (PAO) lubricant. PAOs can be prepared via the oligomerization of alpha-olefins (typically 1-decene, sometimes 1-octene and 1-dodecene). Other chemistry that is relevant includes ExxonMobil's Ultra High Viscosity Index PAO lubricants. Currently, PAOs are synthesized by a two-step reaction sequence from linear alpha-olefins, which are derived from ethylene. The first step is the synthesis of a mixture of oligomers, which are polymers of relatively low molecular weight. This first step is catalyzed using a boron trifluoride catalyst in conjunction with a protic catalyst such as water, alcohol, or a weak carboxylic acid. However, it has been observed that boron trifluoride catalysis causes excess skeletal branching during the oligomerization process. An increase in the amount of skeletal branching directly correlates with an increase in the number of tertiary hydrogens in the molecule, which are prone to oxidation, and therefore exhibit poor stability when used in lubricants. The second step in the manufacturing process entails hydrogenation of the unsaturated oligomer.

However, in order to generate PAOs, a four-stage process is required: 1) ethylene oligomerization, 2) separation of the alpha-olefin (e.g. 1-decene), 3) oligomerization of the alpha-olefin, and 4) hydrogenation). Therefore, there is a need for a process to generate a branched hydrocarbon-based lubricant at a lower cost of manufacture compared to existing PAO products made from oligomerization of alpha-olefins. In addition, there is a need for a branched hydrocarbon-based lubricant that imparts improved performance relative to PAO lubricants, such as higher viscosity index.

BRIEF SUMMARY

In one aspect a process is provided for preparing a lubricant product, comprising combining at least one olefin and at least one coordination-insertion catalyst, wherein the coordination-insertion catalyst is a metal-ligand complex wherein the metal is selected from zirconium, hafnium and titanium, and has an ethylene/octene reactivity ratio up to 20, at an operating reactor temperature, and a kinetic chain length up to 20 monomer units; under conditions such that at least one oligomer product is formed. The process further comprises fractionating the oligomer product to produce a fractionated oligomer product, such that the average carbon number of the fractionated oligomer product is 20 or greater; and hydrogenating the fractionated oligomer product to form the lubricant product.

In another aspect, a saturated hydrocarbon lubricant product is provided, comprising 20 or more carbon atoms and a carbon chain with an average of more than one branch per molecule. The saturated hydrocarbon lubricant product is prepared by a process comprising the steps of combining at least one olefin and at least one coordination-insertion catalyst, wherein the coordination-insertion catalyst is a metal-ligand complex wherein the metal is selected from zirconium, hafnium and titanium, and has an ethylene/octene reactivity ratio up to 20, and a kinetic chain length up to 20 monomer units; under conditions such that at least one oligomer product is formed; fractionating the oligomer product to produce a fractionated oligomer product, such that the average carbon number of the fractionated oligomer product is 20 or greater; and hydrogenating the fractionated oligomer product to form the saturated hydrocarbon lubricant product.

DETAILED DESCRIPTION

Figure 1:
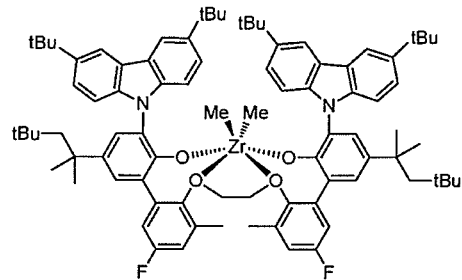
FIG. 1 is a formula drawing of a coordination-insertion catalyst of the formula 2',2'''-(ethane-1,2-diylbis(oxy))bis(3-(3,6-di-tert-butyl-9H-carbazol-9-yl)-5'-fluoro-3'-methyl-5-(2,4,4-trimethylpentan-2-yl)-[1,1'-biphenyl]-2-ol)-zirconiumdimethyl.

A branched polyolefin is prepared via ethylene oligomerization, generating a mixture of branched olefins, which are then converted to saturated hydrocarbon upon hydrogenation. Prior to hydrogenation, low molecular weight by-products (less than C20) are separated. The process can include (1) formation of the branched oligomer, (2) separation of the low molecular weight fraction, and (3) hydrogenation of the desired fraction. Optional steps include further fractionation(s) of the desired fraction to further refine specific grades, such as tailoring viscosity, volatility, etc.

The preparation of the oligomer comprises (1) oligomerization of the starting olefin or olefin mixture using a catalyst and appropriate process conditions, and (2) fractionation(s) to obtain the desired fraction(s) to generate the lubricant precursor (unsaturated), such that the average carbon number of the fraction is greater than C20. When a carbon number is given, it means a distribution of molecules averaging that carbon number. For example C20 means a distribution of molecules averaging twenty carbon atoms.

The oligomer is further hydrogenated to obtain a mostly saturated product that is used in lubricant applications. The lubricant is a direct alternative to commercial PAO lubricants. The invention is advantageous in that it provides improved lubricant properties, such as higher viscosity index, and has a lower cost of manufacture than existing PAO lubricants made from 1-decene oligomerization (or 1-C8 and 1-C12). In the previous processes, expensive alpha-olefins are used. The current invention uses low-cost ethylene to make a mixture/distribution of alpha-olefins in situ that are then co-oligomerized with ethylene in a single reactor through back-mixing and tuned termination/propagation rates. The lubricant of the present invention can be obtained in three stages from an olefin such as ethylene: (1) oligomerization, 2) separation of low molecular weight products, and 3) hydrogenation, while PAOs are obtained from a four-stage process: (1) ethylene oligomerization, 2) separation of the alpha-olefin (e.g. 1-decene), 3) oligomerization of the alpha-olefin, and 4) hydrogenation).

The oligomerization stage of preparing a lubricant product may comprise combining at least one starting olefin and at least one coordination-insertion catalyst.

The starting olefin may be ethylene alone, or a proportion of an alpha-olefin comonomer may be included along with ethylene. The starting olefin may also be any terminal olefin, for example, linear olefins. If an alpha-olefin is to be included, it may be selected from, in non-limiting example, linear alpha-olefins having from 3 to 12 carbons, such as propylene, 1-butene, 1-pentene, 1-hexene, 1-heptene, 1-octene, 1-nonene, 1-decene, 1-undecene, 1-dodecene, and combinations thereof.

In the inventive process the selected starting olefin or olefins, is/are contacted with a suitable coordination-insertion catalyst. As the term is used here, "coordination-insertion" means that the catalysts are capable of consecutively inserting unsaturated monomers, with the result that previously unsaturated carbons in the monomers and the oligomer become the backbone of a new oligomer. This catalyst may be selected, in one embodiment, from a wide variety of metal-ligand complexes. Those skilled in the art will be aware that catalyst performance varies with process temperature and also may vary with reaction mixture composition and conversion. Preferred catalysts are those exhibiting an activity level of 100,000 grams of oligomer per gram of catalyst metal (g/g cat). Also preferred are catalysts capable of producing a chain termination rate that results in product oligomer of a desired molecular weight and having a high fraction, preferably at least 25%, more preferably at least 50%, and most preferably at least 75%, of vinyl groups.

Kinetic chain length is also important in identifying particularly suitable catalysts for the present invention. Kinetic chain length is defined as the average number of monomeric repeat units incorporated by a catalyst before a chain transfer or chain growth terminating reaction.

Examples of suitable coordination-insertion catalysts may generally include, in certain non-limiting embodiments, metal-ligand complexes including any of the metals zirconium, hafnium, or titanium, and preferably zirconium or hafnium. Among these catalysts may be certain metallocene catalysts, including certain constrained geometry catalysts, and bis-phenylphenoxy catalysts, provided that the selected catalyst meets the ethylene/octene reactivity ratio and kinetic chain length requirements as defined hereinabove.

The metallocene compounds useful herein are cyclopentadienyl derivatives of titanium, zirconium, and hafnium. These metallocertes titanocenes, zirconocenes and hafnocenes) may be represented by the following formula:

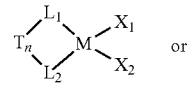

formula (I)

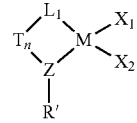

formula (II)

wherein M is the metal center, and is a Group 4 metal, preferably titanium, zirconium or hafnium;

T is an optional bridging group which, if present, in preferred embodiments is selected from dialkylsilyl, diarylsilyl, dialkylmethyl, ethylenyl (—$CH_2$—$CH_2$—) or hydrocarbylethylenyl wherein one, two, three or four of the hydrogen atoms in ethylenyl are substituted by hydrocarbyl, where hydrocarbyl can be independently $C_1$ to $C_{16}$ alkyl or phenyl, tolyl, xylyl and the like, and when T is present, the catalyst represented can be in a racemic or a meso form;

$L_1$ and $L_2$ are the same or different cyclopentadienyl, indenyl, tetrahydroindenyl or fluorenyl rings, optionally substituted, that are each bonded to M, or $L_1$ and $L_2$ are the same or different cyclopentadienyl, indenyl, tetrahydroindenyl or fluorenyl, which are optionally substituted, in which any two adjacent R groups on these rings are optionally joined to form a substituted or unsubstituted, saturated, partially unsaturated, or aromatic cyclic or polycyclic substituent;

Z is nitrogen, oxygen or phosphorus;

R' is a cyclic linear or branched $C_1$ to $C_{40}$ alkyl or substituted alkyl group; and $X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand.

Among the metallocene compounds which can be used in this invention are stereorigid, chiral or asymmetric, bridged or non-bridged, or so-called "constrained geometry" metallocenes. See, for example and methods for preparation, U.S. Pat. No. 4,892,851; U.S. Pat. No. 5,017,714; U.S. Pat. No. 5,132,281; U.S. Pat. No. 5,155,080; U.S. Pat. No. 5,296,434; U.S. Pat. No. 5,278,264; U.S. Pat. No. 5,318,935; U.S. Pat. No. 5,969,070; U.S. Pat. No. 6,376,409; U.S. Pat. No.

6,380,120; U.S. Pat. No. 6,376,412; WO-A-(PCT/US92/10066); WO 99/07788; WO-A-93/19103; WO 01/48034; EP-A2-0 577 581; EP-A1-0 578 838; WO 99/29743, and also the academic literature, e.g., "The Influence of Aromatic Substituents on the Polymerization Behavior of Bridged Zirconocene Catalysts," Spaleck, W., et al., *Organometallics* 1994, *Vol.* 13, pp. 954-963; "ansa-Zirconocene Polymerization Catalysts with Annelated Ring Ligands—Effects on Catalytic Activity and Polymer Chain Lengths," Brintzinger, H., et al., *Organometallics* 1994, *Vol.* 13, pp. 964-970; "Constrained geometry complexes—Synthesis and applications," Braunschweig, H., et al., *Coordination Chemistry Reviews* 2006, 250, 2691-2720; and documents referred to therein.

The process uses as catalysts a particular subset of the bis-phenylphenoxy compounds described in US20110282018. These are termed metal-ligand complex catalysts that combine a transition metal center and any of a wide variety of bis-phenylphenoxy-containing ligands conforming to formula (I), provided that the following limitations are met. First, the bridge, L, between the Z moieties is from 2 atoms to 8 atoms in length. Second, the Z moieties may be selected independently from oxygen, sulfur, phosphorus($C_{1-40}$)hydrocarbylene, and nitrogen($C_{1-40}$)hydrocarbylene. Third, the ligand has a halogen atom located in at least one of the positions on the benzene rings in the $R^{1a}$ and/or $R^{1b}$ position of formula (I), i.e., at a position, or positions, that is/are ortho to the bridged Z moieties. The term "halogen atom" means a fluorine atom radical (F), chlorine atom radical (Cl), bromine atom radical (Br), or iodine atom radical (I). Preferably each halogen atom independently is a Br, F, or Cl radical, and more preferably a F or Cl radical. Fourth, the metal M is preferably selected from zirconium (Zr), hafnium (Hf), and titanium (Ti), and more preferably is either Zr or Hf.

The members of the catalyst family defined are generally convenient to prepare and may operate efficiently and over a wide thermal operating range, in some non-limiting embodiments withstanding temperatures exceeding 200° C. Such catalysts may, themselves, be of effectively any molecular weight ($M_w$), but in certain non-limiting embodiments preferably range from 200 Daltons (Da) to 5,000 Da. Preparation may include, in non-limiting embodiments, construction of a suitable ligand structure followed by its reaction with a salt of the desired transition metal, which effects the desired metal-ligand complexation. Additional and highly detailed preparation information may be found in, e.g., the previously referenced US20110282018; US Serial Number PCT/US2012/0667700, filed Nov. 28, 2012, claiming priority to U.S. Provisional Application 61/581,418, filed Dec. 29, 2011; and U.S. Ser. No. 13/105,018, filed May 11, 2011, Publication Number 20110282018, claiming priority to U.S. Provisional Application 61/487,627, filed Mar. 25, 2011. Those skilled in the art will recognize that similar and analogous processes may be used to prepare other useful bis-phenylphenoxy compounds falling within the given general definition.

In certain embodiments, such suitable catalysts may generally include, in more specific but non-limiting embodiments, metal-ligand complexes of formula (III)

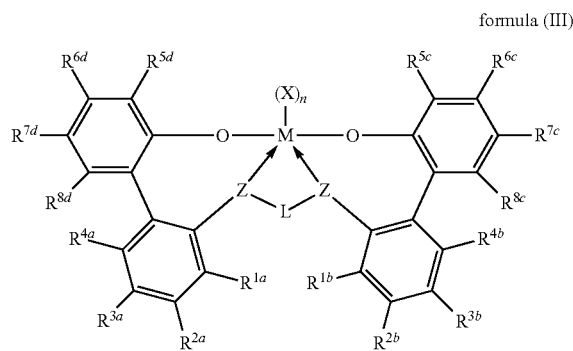

formula (III)

wherein M is titanium, zirconium, or hafnium, each independently being in a formal oxidation state of +2, +3, or +4; n is an integer of from 0 to 3, wherein when n is 0, X is absent; each X independently is a monodentate ligand that is neutral, monoanionic, or dianionic, or two X are taken together to form a bidentate ligand that is neutral, monoanionic, or dianionic; X and n are selected such that the metal-ligand complex is, overall, neutral; each Z is independently O, S, N($C_1$-$C_{40}$)hydrocarbyl, or P($C_1$-$C_{40}$)hydrocarbyl; L is ($C_1$-$C_{40}$)hydrocarbylene or ($C_1$-$C_{40}$)heterohydrocarbylene, wherein the ($C_1$-$C_{40}$)hydrocarbylene has a portion that comprises a 2- to 8-atom linker backbone linking the Z moieties and the ($C_1$-$C_{40}$)heterohydrocarbylene has a portion that comprises a 2- to 8-atom linker backbone linking the Z moieties, wherein each atom of the 2- to 8-atom linker of the ($C_1$-$C_{40}$)heterohydrocarbylene independently is a carbon atom or a heteroatom, wherein each heteroatom independently is O, S, S(O), S(O)$_2$, Si($R^C$)$_2$, Ge($R^C$)$_2$, P($R^P$), or N($R^N$), wherein independently each $R^C$ is unsubstituted ($C_1$-$C_{18}$)hydrocarbyl or the two $R^C$ are taken together to form a ($C_2$-$C_{19}$)alkylene, each $R^P$ is unsubstituted ($C_1$-$C_{18}$)hydrocarbyl; and each $R^N$ is unsubstituted ($C_1$-$C_{18}$)hydrocarbyl, a hydrogen atom or absent; $R^{1a}$, $R^{1b}$, or both is a halogen atom; $R^{2a}$ and $R^{2b}$ independently is a hydrogen, ($C_1$-$C_{40}$)hydrocarbyl, ($C_1$-$C_{40}$)heterohydrocarbyl, N($R^N$)$_2$, NO$_2$, OR$^C$, SR$^C$, Si($R^C$)$_3$, Ge($R^C$)$_3$, CN, CF$_3$, F$_3$CO, halogen atom; and each of the others of $R^{1a}$, $R^{2a}$, $R^{1b}$, and $R^{2b}$ independently is a hydrogen, ($C_1$-$C_{40}$)hydrocarbyl, ($C_1$-$C_{40}$)heterohydrocarbyl, N($R^N$)$_2$, NO$_2$, OR$^C$, SR$^C$, Si($R^C$)$_3$, CN, CF$_3$, F$_3$CO or halogen atom; each of $R^{3a}$, $R^{4a}$, $R^{3b}$, $R^{4b}$, $R^{6c}$, $R^{7c}$, $R^{8c}$, $R^{6d}$, $R^{7d}$, and $R^{8d}$ independently is a hydrogen atom; ($C_1$-$C_{40}$)hydrocarbyl; ($C_1$-$C_{40}$)heterohydrocarbyl; Si($R^C$)$_3$, Ge($R^C$)$_3$, P($R^P$)$_2$, N($R^N$)$_2$, OR$^C$, SR$^C$, NO$_2$, CN, CF$_3$, RCS(O)—, RCS(O)$_2$—, (RC)$_2$C=N—, RCC(O)O—, RCOC(O)—, RCC(O)N(R)—, (RC)2NC(O)— or halogen atom; each of $R^{5c}$ and $R^{5d}$ is independently a ($C_6$-$C_{40}$)aryl or ($C_1$-$C_{40}$)heteroaryl; and each of the aforementioned aryl, heteroaryl, hydrocarbyl, heterohydrocarbyl, hydrocarbylene, and heterohydrocarbylene groups is independently unsubstituted or substituted with one or 5 more substituents $R^S$; and each $R^S$ is independently a halogen atom, polyfluoro substitution, perfluoro substitution, unsubstituted ($C_1$-$C_{18}$)alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, or two of the $R^S$ are taken together to form an unsubstituted ($C_1$-$C_{18}$)alkylene, wherein each R independently is an unsubstituted ($C_1$-$C_{18}$)alkyl.

A wide variety of additional substitution may be present at all other carbons of the at least four phenyl rings included within the catalyst of formula (III) or such may have simply hydrogen. Some examples of preferred $R^{5c}$ and $R^{5d}$ substituents include 3,5-di(tertiary-butyl)phenyl; 3,5-diphenylphenyl; 1-naphthyl, 2-methyl-1-naphthyl; 2-naphthyl; 1,2,3,4-tetrahydronaphthyl; 1,2,3,4-tetrahydro-naphth-5-yl; 1,2,3,4-tetrahydronaphth-6-yl; 1,2,3,4-tetrahydro anthracenyl; 1,2,3,4-tetrahydroanthracen-9-yl; 1,2,3,4,5,6,7,8-octahydroanthracenyl; 1,2,3,4,5,6,7,8-octahydroanthracen-9-yl; phenanthren-9-yl; 1,2,3,4,5,6,7,8-octahydrophenanthren-9-yl; 2,3-dihydro-1H-inden-6-yl; naphthalene-2-yl; 1,2,3,4-tetrahydronaphthalen-6-yl; 1,2,3,4-tetrahydronaphthalen-5-yl; anthracen-9-yl; 1,2,3,4-tetrahydroanthracen-9-yl; 1,2,3,4,5,6,7,8-octahydro-anthracen-9-yl; 2,6-dimethylphenyl; 2,6-diethylphenyl; 2,6-bis(1-methylethyl)phenyl; 2,6-diphenyl-phenyl; 3,5-dimethylphenyl; 3,5-bis(tri-fluoromethyl)phenyl; 3,5-bis(1-methylethyl)phenyl; 3,5-bis(1,1-dimethylethyl)phenyl; 3,5-diphenyl-phenyl); 2,4,6-trimethylphenyl; and 2,4,6-tris(1-methylethyl)phenyl); 1-methyl-2,3-dihydro-1H-inden-6-yl; 1,1-dimethyl-2,3-dihydro-1H-inden-6-yl; 1-methyl-1,2,3,4-tetrahydro-naphthalen-5-yl; 1,1-dimethyl-1,2,3,4-tetrahydronaph-thalen-5-yl; 1,2,3,4-tetrahydroquinolinyl; isoquinolinyl; 1,2,3,4-tetrahydroisoquinolinyl; carbazolyl; 1,2,3,4-tetrahydrocarbazolyl; 1,2,3,4,5,6,7,8-octahydrocarbazolyl; 3,6-di(tertiary-butyl)-carbazolyl; 3,6-di(tertiary-octyl)-carbazolyl; 3,6-diphenylcarbazolyl; 3,6-bis(2,4,6-trimethylphenyl)-carbazolyl; 3,6-di(tertiary-butyl)-carbazol-9-yl; 3,6-di(tertiary-octyl)-carbazol-9-yl; 3,6-diphenylcarbazol-9-yl; 3,6-bis(2,4,6-trimethylphenyl)-carbazol-9-yl; quin-olin-4-yl; quinolin-5-yl; quinolin-8-yl; 1,2,3,4-tetrahydroquinolin-1-yl; isoquinolin-1-yl; isoquinolin-4-yl; iso-quinolin-5-yl; isoquinolin-8-yl; 1,2,3,4-tetrahydroisoquinolin-2-yl; 1H-indol-1-yl; 1H-indolin-1-yl; 9H-carbazol-9-yl; 1,2,3,4-tetrahydrocarbazolyl-9-yl; 1,2,3,4,5,6,7,8-octahydrocarbazolyl-9-yl; 4,6-bis(1,1-dimethylethyl)pyridine-2-yl; 4,6-diphenylpyridin-2-yl; 3-phenyl-1H-indol-1-yl; 3-(1,1-dimethylethyl)-1H-indol-1-yl; 3,6-diphenyl-9H-carbazol-9-yl; 3,6-bis[2',4',6'-tris(1,1-dimethylphenyl)]-9H-carbazol-9-yl; 3,6-bis(1,1-dimethyl-ethyl)-9H-carba-zol-9-yl.

Figure 2:
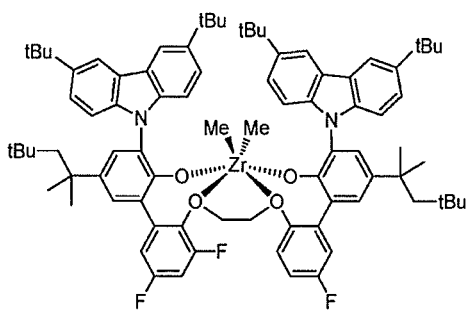
FIG. 2 is a formula drawing of a coordination-insertion catalyst of the formula 3-(3,6-di-tert-butyl-9H-carbazol-9-yl)-2'-(2-((3'-(3,6-di-tert-butyl-9H-carbazol-9-yl)-5-fluoro-2'-hydroxy-5'-(2,4,4-trimethylpentan-2-yl)-[1,1'-biphenyl]-2-yl)oxy)ethoxy)-3',5'-difluoro-5-(2,4,4-trimethylpentan-2-yl)-[1,1'-biphenyl]-2-ol-zirconiumdimethyl.
Figure 3:
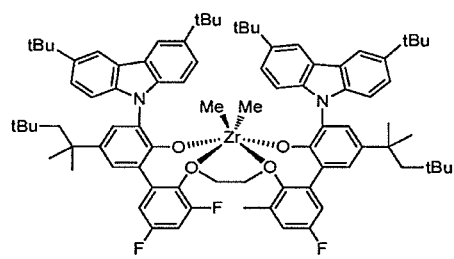
FIG. 3 is a formula drawing of a coordination-insertion catalyst of the formula 3-(3,6-di-tert-butyl-9H-carbazol-9-yl)-2'-(2-((3'-(3,6-di-tert-butyl-9H-carbazol-9-yl)-3,5-difluoro-2'-hydroxy-5'-(2,4,4-trimethylpentan-2-yl)-[1,1'-biphenyl]-2-yl)oxy)ethoxy)-5'-fluoro-3'-methyl-5-(2,4,4-trimethylpentan-2-yl)-[1,1'-biphenyl]-2-ol-zirconiumdimethyl.
Figure 4:
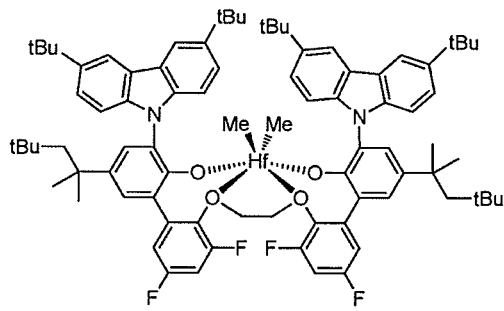
FIG. 4 is a formula drawing of a coordination-insertion catalyst of the formula 2',2'''-(ethane-1,2-diylbis(oxy))bis(3-(3,6-di-tert-butyl-9H-carbazol-9-yl)-3',5'-difluoro-5-(2,4,4-trimethylpentan-2-yl)-[1,1'-biphenyl]-2-ol)-hafniumdimethyl.
Figure 5:
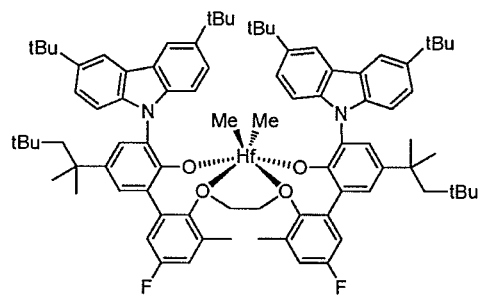
FIG. 5 is a formula drawing of a coordination-insertion catalyst of the formula 2',2'''-(ethane-1,2-diylbis(oxy))bis(3-(3,6-di-tert-butyl-9H-carbazol-9-yl)-5'-fluoro-3'-methyl-5-(2,4,4-trimethylpentan-2-yl)-[1,1'-biphenyl]-2-ol)-hafniumdimethyl.
Figure 6:
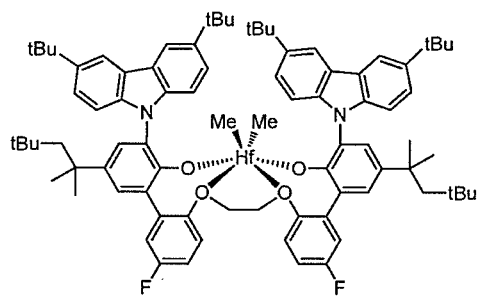
FIG. 6 is a formula drawing of a coordination-insertion catalyst of the formula 6',6'''-(ethane-1,2-diylbis(oxy))bis(3-(3,6-di-tert-butyl-9H-carbazol-9-yl)-3'-fluoro-5-(2,4,4-trimethylpentan-2-yl)-[1,1'-biphenyl]-2-ol)-hafniumdimethyl.
Figure 7:
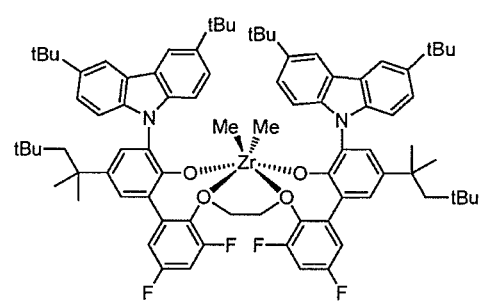
FIG. 7 is a formula drawing of a coordination-insertion catalyst of the formula 2',2'''-(ethane-1,2-diylbis(oxy))bis(3-(3,6-di-tert-butyl-9H-carbazol-9-yl)-3',5'-difluoro-5-(2,4,4-trimethylpentan-2-yl)-[1,1'-biphenyl]-2-ol)-zirconiumdiemethyl.

In more particular embodiments, the catalyst may be selected from the compounds represented by formulas (IV) to (X), shown in FIGS. 1-7. Additional moieties denoted by abbreviations include Me (methyl) and t-Bu (tert-butyl).

In carrying out the process of the invention it is desirable that the contact between the olefin(s) and the coordination-insertion catalyst occur in a continuously-fed backmixed reactor zone. As the term is used herein, "backmixed reactor zone" refers to an environment wherein a reaction product is intermingled with unconverted reactor feeds. A continuous stirred tank reactor is preferred for this purpose, while it is noted that plug-flow reactors are specifically designed to prevent back-mixing. However, a loop reactor can accomplish a variable degree of backmixing by recycling a portion of reactor effluent to the feed of a plug-flow zone, with the recycle ratio moderating the degree of backmixing. Thus, plug-flow reactors are non-preferred, while a loop reactor with a plug flow zone is preferred. In the inventive process backmixing ensures reaction of already-produced oligomers with new feedstock, e.g., ethylene. It is this continuous contact that enables the oligomers to become branched via repeated olefin insertion.

Conditions under which the contact occurs in the continuously-fed, backmixed reactor zone may include a temperature desirably ranging from 0° C. to 250° C., more desirably from 25° C. to 200° C., and most desirably from 50° C. to 180° C.; an ethylene partial pressure desirably ranging from 15 psi (pounds per square inch, 103 kilopascals, kPa) to 500 psi (3450 kPa), more desirably from 30 psi (207 kPa) to 300 psi (2070 kPa), and most desirably from 50 psi (345 kPa) to 200 psi (1380 kPa); and a residence time desirably ranging from 1 minute (min) to 120 min, more desirably from 5 min to 60 min, and most desirably from 10 min to 30 min. A reactor system may be comprised of many low residence time reaction zones or a few high residence time reaction zones. Nonetheless, those skilled in the art will easily understand that alteration of parameters may be employed for reasons of convenience, alteration of yield, avoidance of undesirable side products or degradation, and the like.

In order to prepare the homo-oligomers or co-oligomers of the invention, the starting olefin and/or the selected alpha-olefin monomer(s) is/are fed into a suitable reactor, for batch, semi-continuous, or continuous production, wherein such olefin(s) will come into contact with the catalyst. In the case of preparation of a co-oligomer, it is noted that the ethylene/alpha-olefin reactivity ratio is distinct for any given catalyst and provides a methodology to determine the amount of alpha-olefin that will be required to attain a targeted co-oligomer composition. Reactivity ratios may be determined using well known theoretical techniques or empirically derived from actual polymerization data. Suitable theoretical techniques are disclosed, for example, in B. G. Kyle, *Chemical and Process Thermodynamics*, $3^{rd}$ ed., Prentice-Hall (1999) and in Soave, Giorgio. "Equilibrium constants from a modified Redlich-Kwong equation of state", *Chemical Engineering Science*, Vol. 27, Issue 6, June 1972, pp. 1197-1203. Commercially available software programs may be used to assist in deriving reactivity ratios from experimentally derived data. One example of such software is *Aspen Plus* from Aspen Technology, Inc., Ten Canal Park, Cambridge, Mass. 02141-2201, USA.

If an alpha-olefin is used, it is often preferred in many co-oligomer compositions that the amount of alpha-olefin included be less than the amount of the starting olefin, simply for reasons of relative cost of the monomers. Thus, it is often, although not always, preferred that the target amount of alpha-olefin in a co-oligomer range from 1 to 30 mole percent (mol %); more preferably from 1 to 25 mol %; and still more preferably from 0 to 20 mol %.

The metal-ligand complex discussed above is rendered catalytically active by contacting it to, or combining it with, the activating co-catalyst or by using an activating technique such as those that are known in the art for use with metal-based olefin polymerization reactions. Suitable activating co-catalysts for use herein include alkyl aluminums; polymeric or oligomeric alumoxanes (also known as aluminoxanes); neutral Lewis acids; and non-polymeric, non-coordinating, ion-forming compounds, including but not limited to the use of such compounds under oxidizing conditions. A suitable activating technique may be bulk electrolysis. Combinations of one or more of the foregoing activating co-catalysts and/or techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Alumoxanes and their preparations are described in, for additional understanding, U.S. Pat. No. 6,103,657. Examples of preferred polymeric or oligomeric alumoxanes are methylalumoxane, triisobutylaluminum-modified methylalumoxane, and isobutylalumoxane. Such may be employed such that the ratio of total number of moles of the one or more metal-ligand complexes of formula (III) to total number of moles of activating co-catalyst is preferably from 1:10,000 to 100:1.

A variety of homo-oligomerization or co-oligomerization conditions and combinations thereof may be employed, according to the starting materials, nature of the reaction (batch, semi-continuous, or continuous), apparatus set-up, desired products, and so forth. However, in general, suitable oligomers or co-oligomers of the invention may be produced using one or more of the specified catalyst selections at a temperature ranging from 20 degrees Celsius (° C.) to 220° C., and preferably 100° C. to 200° C., for a time preferably ranging from 10 minutes (min) to 300 min. Other parameters, such as pressure, may be controlled within ranges known to those skilled in the art and are not generally considered to be critical to practice of the present invention, but may be varied according to the desires and needs of the practitioner. It is usually preferred to carry out the process as a continuous process, using at least one continuous stir tank reactor (CSTR) or other suitable vessel(s).

The process may further comprise fractionating the oligomer product to produce a fractionated oligomer product. The average carbon number of the fractionated oligomer product may be 20 or greater. Finally, the process may comprise hydrogenating the fractionated oligomer product to form the lubricant product. The lubricant product may be a saturated hydrocarbon. The lubricant product may also comprise 20 or more carbon atoms and/or a carbon chain with more than one branch.

Hydrogenation of the ethylene/octene oligomer can be performed using Pd, Rh, Pt, Ni, Ru, or other catalysts that are tolerant to traces of the catalyst used for the olefin oligomer preparation. Pd catalysts are preferred as they usually show the highest activity. The catalysts can be used on different supports including activated carbon, alumina, silica or their mixtures or without a support like Raney Ni. Activated carbon is a preferred support for platinum group catalysts. Catalyst amounts deposited on the support can be from 0.1 weight percent to 20 weight percent with preferred percentages from 1 weight percent to 10 weight percent. Catalyst loadings relative to the olefin can be from 0.01 weight percent to 10 weight percent with a preferred range of 0.1-2 weight percent. The reaction can be carried out in any solvent that dissolves the starting material, is not hydrogenated itself, and does not deactivate the catalyst, for example, alkanes like hexane, heptane or octane, tetrahydrofuran, 2-propanol or toluene. However, preferably, the hydrogenation of the ethylene/octene oligomer occurs without a solvent. The hydrogenation can be run in both batch and continuous modes. In the batch mode, the catalyst can be filtered off and recycled after each consecutive reaction as far as its activity is sufficiently high and allows for running a process. If catalyst activity is diminished significantly, a catalyst reactivation protocol can be applied to restore catalyst properties.

The lubricant product may have a kinematic viscosity at 40 degrees Celsius of greater than 4.5 cSt. The lubricant product may have a kinematic viscosity at 100 degrees Celsius of greater than 1.5 cSt. Kinematic viscosity may be tested according to ASTM D445 (Standard test method for kinematic viscosity of transparent and opaque liquids). The kinematic viscosity can be determined from the time (in seconds) that it takes for a fixed volume of oil sample to gravity flow through the capillary of a calibrated viscometer at constant temperature. Conversion of the measured flow time and the calibration constant of the viscometer yield the kinematic viscosity value.

Optionally, the lubricant may be prepared via oligomerization of both ethylene and a co-monomer, such as 1-octene, 1-hexene or 1-butene. While likely more expensive compared to the ethylene-only process, other performance advantages may be obtained as well. For instance, higher levels of co-monomer incorporation may allow for lower pour points and improved cold temperature performance.

EXAMPLES

Various examples are demonstrated.

Example 1: Ethylene-Octene Oligomerization

Oligomerizations are conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve, which empties the reactor contents into a stainless steel dump pot, which is prefilled with a catalyst kill solution (typically 5 mL of an Irgafos™/Irganox™/toluene mixture).

The dump pot is vented to a thirty gallon blowdown tank, with both the pot and the tank $N_2$ purged. All chemicals used for oligomerization or catalyst makeup are run through purification columns to remove any impurities that may affect oligomerization. Liquid feeds such as alpha-olefin and solvents are passed through two columns, the first containing $Al_2O_3$ alumina, the second containing Q5, which is a copper reactant to scrub oxygen. Ethylene feed is passed through two columns, the first containing $Al_2O_3$ alumina and 4 Angstroms (Å) average pore size molecular sieves to remove water, the second containing Q5 reactant. The $N_2$, used for transfers, is passed through a single column containing $Al_2O_3$ alumina, 4 Å average pore size molecular sieves, and Q5 reactant.

The reactor is loaded first from the shot tank containing alpha-olefin, depending on desired reactor load. The shot tank is filled to the load set points by use of a lab scale to which the shot tank is mounted. Toluene or Isopar™ E solvent is added in the same manner as alpha-olefin. After liquid feed addition, the reactor is heated up to the polymerization temperature set point. Ethylene is added to the reactor when at reaction temperature to maintain reaction pressure set point. Ethylene addition amounts are monitored by a micro-motion flow meter and integrated to give overall ethylene uptake after catalyst injection.

The catalyst and bis (octadecyl)methylammonium tetrakis (pentafluorophenyl) borate ($[HNMe(C_{18}H_{37})_2][B(C_6F_5)_4]$) (BOMATPB) activator are mixed with an appropriate amount of purified toluene to achieve a desired molarity solution. The catalyst and activator are handled in an inert glove box, drawn into a syringe, and pressure transferred into the catalyst shot tank. This is followed by three rinses of toluene, 5 mL each Immediately after catalyst addition the run timer begins. Ethylene is then added continuously by the Camile™ to maintain reaction pressure set point in the reactor. If the ethylene uptake rate is low, then the headspace is purged, more catalyst and activator are added, and the ethylene pressure is re-established. After a designated time or ethylene uptake the agitator is stopped and the bottom dump valve opened to empty reactor contents to the dump pot. The dump pot contents are poured into trays placed in a lab hood where the solvent is evaporated off overnight. The trays containing the remaining oligomer are then transferred to a vacuum oven, where they are heated up to 140° C. under vacuum to remove any remaining volatile species. After the trays cool to ambient temperature, the product is weighed for yield/efficiencies, and submitted for testing.

A series of semibatch oligomerizations are performed with catalysts with the general formula III:

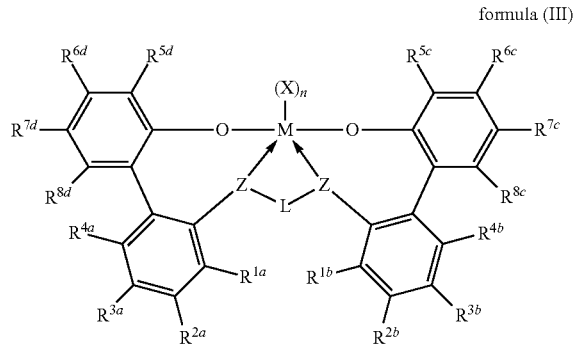

formula (III)

wherein M is titanium, zirconium, or hafnium, each independently being in a formal oxidation state of +2, +3, or +4; n is an integer of from 0 to 3, wherein when n is 0, X is absent; each X independently is a monodentate ligand that is neutral, monoanionic, or dianionic, or two X are taken together to form a bidentate ligand that is neutral, monoanionic, or dianionic; X and n are selected such that the metal-ligand complex of formula (III) is, overall, neutral; each Z is independently O, S, N($C_1$-$C_{40}$)hydrocarbyl, or P($C_1$-$C_{40}$)hydrocarbyl; L is ($C_1$-$C_{40}$)hydrocarbylene or ($C_1$-$C_{40}$)heterohydrocarbylene, wherein the ($C_1$-$C_{40}$)hydrocarbylene has a portion that comprises a 2-carbon atom to 3-atom linker backbone linking the Z atoms in formula (III) and the ($C_1$-$C_{40}$)heterohydrocarbylene has a portion that comprises a 2-atom to 3-atom linker backbone linking the Z atoms in formula (III), wherein each atom of the 2-atom to 3-atom linker of the ($C_1$-$C_{40}$)heterohydrocarbylene independently is a carbon atom or a heteroatom, wherein each heteroatom independently is O, S, S(O), S(O)$_2$, Si($R^C$)$_2$, Ge($R^C$)$_2$, P($R^P$), or N($R^N$), wherein independently each $R^C$ is unsubstituted ($C_1$-$C_{18}$)hydrocarbyl or the two $R^C$ are taken together to form a ($C_2$-$C_{19}$)alkylene, each $R^P$ is unsubstituted ($C_1$-$C_{18}$)hydrocarbyl; and each $R^N$ is unsubstituted ($C_1$-$C_{18}$)hydrocarbyl, a hydrogen atom or absent; $R^{1a}$, $R^{2a}$, $R^{1b}$, and $R^{2b}$ independently is a hydrogen, ($C_1$-$C_{40}$)hydrocarbyl, ($C_1$-$C_{40}$)heterohydrocarbyl, N($R^N$)$_2$, NO$_2$, OR$^C$, SR$^C$, Si($R^C$)$_3$, Ge($R^C$)$_3$, CN, CF$_3$, F$_3$CO, halogen atom; and each of the others of $R^{1a}$, $R^{2a}$, $R^{1b}$, and $R^{2b}$ independently is a hydrogen, ($C_1$-$C_{40}$)hydrocarbyl, ($C_1$-$C_{40}$)heterohydrocarbyl, N($R^N$)$_2$, NO$_2$, OR$^C$, SR$^C$, Si($R^C$)$_3$, CN, CF$_3$, F$_3$CO or halogen atom; each of $R^{3a}$, $R^{4a}$, $R^{3b}$, $R^{4b}$, $R^{6c}$, $R^{7c}$, $R^{8c}$, $R^{6d}$, $R^{7d}$, and $R^{8d}$ independently is a hydrogen atom; ($C_1$-$C_{40}$)hydrocarbyl; ($C_1$-$C_{40}$)heterohydrocarbyl; Si($R^C$)$_3$, Ge($R^C$)$_3$, P($R^P$)$_2$, N($R^N$)$_2$, OR$^C$, SR$^C$, NO$_2$, CN, CF$_3$, RCS(O)—, RCS(O)$_2$—, (RC)$_2$C=N—, RCC(O)O—, RCOC(O)—, RCC(O)N(R)—, (RC)2NC(O)— or halogen atom; each of $R^{5c}$ and $R^{5d}$ is independently a ($C_6$-$C_{40}$)aryl or ($C_1$-$C_{40}$)heteroaryl; and each of the aforementioned aryl, heteroaryl, hydrocarbyl, heterohydrocarbyl, hydrocarbylene, and heterohydrocarbylene groups is independently unsubstituted or substituted with one or 5 more substituents $R^S$; and each $R^S$ is independently a halogen atom, polyfluoro substitution, perfluoro substitution, unsubstituted ($C_1$-$C_{18}$)alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, or two of the $R^S$ are taken together to form an unsubstituted ($C_1$-$C_{18}$)alkylene, wherein each R independently is an unsubstituted ($C_1$-$C_{18}$)alkyl.

In more particular embodiments, the catalyst may be selected from the compounds represented by formulas (IV) to (X). Semibatch oligomerizations may be performed with catalysts such as 2',2'''-(ethane-1,2-diylbis(oxy))bis(3-(3,6-di-tert-butyl-9H-carbazol-9-yl)-5'-fluoro-3'-methyl-5-(2,4,4-trimethylpentan-2-yl)-[1,1'-biphenyl]-2-ol)-zirconiumdimethyl (Formula IV), 3-(3,6-di-tert-butyl-9H-carbazol-9-yl)-2'-(2-((3'-(3,6-di-tert-butyl-9H-carbazol-9-yl)-5-fluoro-2'-hydroxy-5'-(2,4,4-trimethylpentan-2-yl)-[1,1'-biphenyl]-2-yl)oxy)ethoxy)-3',5'-difluoro-5-(2,4,4-trimethylpentan-2-yl)-[1,1'-biphenyl]-2-ol-zirconiumdimethyl (Formula V), 3-(3,6-di-tert-butyl-9H-carbazol-9-yl)-2'-(2-((3'-(3,6-di-tert-butyl-9H-carbazol-9-yl)-3,5-difluoro-2'-hydroxy-5'-(2,4,4-trimethylpentan-2-yl)-[1,1'-biphenyl]-2-yl)oxy)ethoxy)-5'-fluoro-3'-methyl-5-(2,4,4-trimethylpentan-2-yl)-[1,1'-biphenyl]-2-ol-zirconiumdimethyl (Formula VI), 2',2'''-(ethane-1,2-diylbis(oxy))bis(3-(3,6-di-tert-butyl-9H-carbazol-9-yl)-3',5'-difluoro-5-(2,4,4-trimethylpentan-2-yl)-[1,1'-biphenyl]-2-ol)-hafniumdimethyl (Formula VII), 2',2'''-(ethane-1,2-diylbis(oxy))bis(3-(3,6-di-tert-butyl-9H-carbazol-9-yl)-5'-fluoro-3'-methyl-5-(2,4,4-trimethylpentan-2-yl)-[1,1'-biphenyl]-2-ol)-hafniumdimethyl (Formula VIII), 6',6'''-(ethane-1,2-diylbis(oxy))bis(3-(3,6-di-tert-butyl-9H-carbazol-9-yl)-3'-fluoro-5-(2,4,4-trimethylpentan-2-yl)-[1,1'-biphenyl]-2-ol)-hafniumdimethyl (Formula IX), and 2',2'''-(ethane-1,2-diylbis(oxy))bis(3-(3,6-di-tert-butyl-9H-carbazol-9-yl)-3',5'-difluoro-5-(2,4,4-trimethylpentan-2-yl)-[1,2'-biphenyl]-2-ol)-zirconiumdiemethyl (Formula X) catalysts at 60° using octene as a reaction solvent (Tables 1 and 2 below). The semibatch nature of the reaction is due to the continuous feeding of ethylene gas to maintain a constant pressure, and excess butene is purged out to allow the continued consumption of ethylene. The average number of carbons per product oligomer is calculated assuming all molecules have a single unsaturation group. The process parameters and viscosities are shown in Tables 1 and 2 below.

TABLE 1

| Run # | Temp (° C.) | IsoparE (g) | Octene (g) | M (3 psi) | Press (psi) | Int Eth (g) | Run Time (min) | Catalyst Name | μmoles | metal |
|---|---|---|---|---|---|---|---|---|---|---|
| 1 | 140 | — | 650 | — | 150 | 19 | 10 | Formula IX | 1 | Hf |
| 2 | 140 | — | 650 | — | 70 | 6.5 | 10 | Formula IV | 3 | Zr |
| 3 | 140 | — | 650 | — | 70 | 5.7 | 10 | Formula VIII | 3 | Hf |

TABLE 1-continued

| Run # | RIBS 2 μmoles | MMAQ μmoles | Exotherm (° C.) | Ethylene (g) added | Yield (g) | Efficiency Gpoly/ gMetal | Viscosity (cSg @ 40 C.) |
|---|---|---|---|---|---|---|---|
| 1 | 1.2 | 15 | 8.3 | 22.0 | 242.9 | 1,360,861 | 1204.1 |
| 2 | 3.6 | 15 | 2.8 | 37.6 | 376.3 | 1,375,004 | 17.96 |
| 3 | 3.6 | 15 | 3.6 | 12.6 | 349.5 | 279,194 | 65.49 |

TABLE 2

| Oil Sample | Remark (MW = molecular weight) | Kinematic Viscosity at 40° C., cSt | Kinematic viscosity at 100° C., cSt | Viscosity Index (calculated using ASTM D2270) | Pour point, ° C. | Fire Point, ° C. (open cup measurements using ASTM D92) |
|---|---|---|---|---|---|---|
| 1 | MW = 2162 | 1204.1 | 108.5 | 185 | −33 | 324 |
| 2 | MW = 602 | 18.0 | 4.2 | 140 | −57 | 208 |
| 3 | MW = 434 | 65.5 | 11.1 | 162 | −51 | N/A |
| Mineral oil (Total SN 150) | | 32 | 5.5 | 108 | −12 | N/A |

Example 2: Steady-State Continuous Stir Tank Reactor (CSTR) Ethylene-Only Oligomerizations Small scale continuous flow solution oligomerizations are carried out in a computer controlled Autoclave Engineers™ reactor equipped with an internal stirrer and a single, stationary baffle operating at about a 9.5 minute average residence time. Purified mixed alkanes solvent (Isopar™ E, available from ExxonMobil, Inc. consisting of C7-C9 isoalkanes and ethylene are supplied at 1.00 gram per minute to a 0.10 liter reactor equipped with a jacket for temperature control, internal cooling coils, and thermocouple. For the various examples the reactor temperature set points range from 60 to 132 degrees Celsius and are maintained by circulating heated oil through the jacket and cooling water through the internal cooling coils. A mass flow controller is used to deliver ethylene to the reactor.

The examples use various coordination-insertion catalysts which are activated with bis (octadecyl)methylammonium tetrakis(pentafluorophenyl) borate ([HNMe(C$_{18}$H$_{37}$)$_2$][B(C$_6$F$_5$)$_4$]) (BOMATBP). Modified methy aluminioxane (MMAO) is used as a scavenger which moderates the effects of polar impurities on catalyst performance. The catalysts are delivered to the reactor as a 0.0001 mole/L solution in toluene; the catalyst activator, BOMATPB, is delivered to the reactor as a 0.00012 mole/L solution in Isopar™ E; and the MMAO scavenger is delivered as a 0.01 mole/L solution in Isopar™ E.

The Isopar™ solvent and solutions of catalyst, activator, and scavenger are fed into the reactor with syringe pumps, with a 1.2 molar ratio of BOMATPB and a 20:1 molar ratio of MMAO per catalyst metal such as Hf or Zr. The feed streams are introduced into the bottom of the reactor via two eductor tubes. The reactor is run liquid-full at 300 to 400 pounds per square inch gauge (psig, 2.1 to 2.7 megapascals, MPa) with vigorous stirring, while the products are removed through an exit line at the top of the reactor. The reactor effluent is electrically heat traced and insulated as it passes through an optical spectrophotometer cell that monitors the ethylene concentration (in grams per deciliter, g/dL). Oligomerization is stopped by the addition of a small amount of water and 2-propanol into the exit line along with a 2:1 mixture of Irgafos™ 168 and Irganox™ 1010 stabilizers, which are added at total level of 2000 parts per million (ppm) based on the mass of ethylene feed. This means that 0.2 gram stabilizer is added for every 100 grams of ethylene feed. The product is devolatilized to remove "light olefins," i.e., the "second hyperbranched oligomer product" having average carbon numbers of 20 or less, and a "first," or target, product, which is an oligomeric oil, is then collected under an inert nitrogen atmosphere and dried in a temperature ramped vacuum oven for approximately 10 hours, with a final high temperature set point of 140 degrees Celsius.

Several catalysts are tested in the continuous flow reactor as shown in Tables 3 and 4 below. Table 4 shows viscosity data for two ethylene-only samples prepared in the CSTR. (As a comparison a high viscosity mineral oil is shown as well (Paralux 6001—Chevron)). For each designated reaction temperature the catalyst feed rate is varied until a targeted steady-state ethylene conversion or oligomer production rate is attained. A steady-state condition is defined as having been achieved when six residence times have elapsed under constant feed with negligible change in ethylene conversion or pressure. The catalyst feed rate is reported in ppm, which is a ratio of catalyst metal weight per weight of total reactor contents. Quantities Cn and Bn are calculated from the $^{13}$C NMR spectra of the recovered oils, where Cn is the ratio of total carbons per unsaturation and Bn is the ratio of ethane carbons per unsaturation. Because there are no added chain transfer agents such as hydrogen or metal alkyls, it is assumed that each oil molecule has a single unsaturation and therefore Cn is assumed to be the average number of carbons per molecule and Bn is assumed to be the average number of ethane branch points per molecule. The quantity Pv is the percent of unsaturated groups that are vinyls and is also expected to be the vinyl endgroup percentage, because each oil molecule is assumed to have a single unsaturated endgroup.

TABLE 3

| Run Number | Temp (deg C.) | Catalyst Name | Catalyst (ppm) | Oligomer (g/min) | Ethylene (g/dL) | Ethylene (% Conversion) | 13C NMR Data per 1000 Carbons | |
|---|---|---|---|---|---|---|---|---|
| | | | | | | | methines | vinyl |
| 4 | 60 | Formula IV | 0.12 | 0.78 | ~0 | >99 | 77.86 | 14.54 |
| 5 | 60 | Formula VII | 0.19 | 0.45 | 0.37 | 96.2 | 86.78 | 24.56 |

| Run Number | 13C NMR Data per 1000 Carbons | | Viscosity at 25° C. | Flash Point (closed cup measurements using ASTM D93 | 13C NMR Calculations | | |
|---|---|---|---|---|---|---|---|
| | vinylene | vinylidene | cps | (deg C.) | Cn | Bn | Pv |
| 4 | 4.81 | 3.56 | 93 | 202 | 43.6 | 3.4 | 63.5 |
| 5 | 3.83 | 5.93 | 18 | n.d. | 29.1 | 2.53 | 71.6 |

TABLE 4

| Oil Sample | Remark | Kinematic viscosity at 40 C., cSt | Kinematic viscosity at 100 C., cSt | Viscosity Index |
|---|---|---|---|---|
| 4 | | 51.2 | 9.1 | 161 |
| 5 | | 34.9 | 6.6 | 147 |
| Paralux 6001 | Commercial Mineral Oil | 102.2 | 12.0 | 107 |

Kinematic Viscosity Measurements

Samples are tested as received according to ASTM D445 (Standard test method for kinematic viscosity of transparent and opaque liquids). The kinematic viscosity is determined from the time (in seconds) that it takes for a fixed volume of oil sample to gravity flow through the capillary of a calibrated viscometer at constant temperature. Conversion of the measured flow time and the calibration constant of the viscometer yield the kinematic viscosity value.

For $^{13}$C NMR measurement, product samples are dissolved in 10 millimeter nuclear magnetic resonance (NMR) tubes in chloroform-$d_1$ (deuterated chloroform) to which 0.02 molar chromium acetylacetonate, $Cr(acac)_3$, is added. The typical concentration is 0.50 grams per 2.4 milliliter. The tubes are then heated in a heating block set at 50° C. The sample tubes are repeatedly vortexed and heated to achieve a homogeneous flowing fluid. For samples with visible wax present, tetrachloroethane-$d_2$ (deuterated tetrachloroethane) is used as the solvent instead of chloroform-$d_1$, and the sample preparation temperature is 90° C. $^{13}$C NMR spectra are taken on a Bruker Avance 400 megaherz (MHz) spectrophotometer equipped with a 10 mm cryoprobe. The following acquisition parameters are used: 5 seconds relaxation delay, 90 degree pulse of 13.1 milliseconds, 256 scans. The spectra are centered at 80 parts per million (ppm) with a spectral width of 250 ppm. All measurements are taken without sample spinning at either 50° C. (for chloroform-$d_1$ solutions) or 90° C. (for tetrachloroethane-$d_2$ solutions). The $^{13}$C NMR spectra are referenced to 77.3 ppm for chloroform-$d_1$ or 74.5 ppm for tetrachloroethane-$d_2$.

Comparative Example

TABLE 5

Chevron Phillips ® Synfluid PAO products (made using process discussed in Background)

| Product | Kinematic Viscosity at 40° C. (cSt) | Kinematic Viscosity at 100° C. (cSt) | Viscosity Index |
|---|---|---|---|
| Synfluid PAO 4 cSt | 16.8 | 3.9 | 124 |
| Synfluid PAO 6 cSt | 30.5 | 5.8 | 138 |
| Synfluid PAO 7 cSt | 37.5 | 6.95 | 148 |
| Synfluid PAO 8 cSt | 46.7 | 7.8 | 137 |
| Synfluid PAO 9 cSt | 54.2 | 9.0 | 146 |

Example 3: Hydrogenation

Ethylene/octene oligomer sample (101.35 g) and 1.0 g of 5% Pd/C catalyst from Johnson Matthew, lot #C-9587 are placed in a 250 mL Parr reactor. The mixture is purged from oxygen by charging 100 psi of hydrogen, stirring the system for 2 minutes, and releasing the pressure. This cycle is repeated three times after which 400 psi of hydrogen is charged and the material is hydrogenated at ambient temperature with stirring at 800 rpm for 1 hour. $^1$H NMR of the sample taken after 1 hour reveals that all olefinic protons of the starting material at about 2 ppm and 4.5-6 ppm completely disappeared. The mixture is filtered using the embedded filter to give the product as a clear liquid in quantitative yield while the used catalyst remains inside the reactor. Hydrogenation is repeated in six additional runs under identical reaction conditions. The mixtures are filtered after reactions and the same catalyst is recycled for a subsequent reaction. The catalyst does not show loss of catalytic activity within the seven consecutive reactions.

While the invention has been described above according to its preferred embodiments, it can be modified within the spirit and scope of this disclosure. This application is therefore intended to cover any variations, uses, or adaptations of the invention using the general principles disclosed herein. Further, the application is intended to cover such departures from the present disclosure as come within the known or customary practice in the art to which this invention pertains and which fall within the limits of the following claims.

What is claimed is:

1. A process for preparing a lubricant product comprising:
   (1) combining at least one olefin and at least one coordination-insertion catalyst, wherein the at least one olefin comprises ethylene and a co-monomer, and
wherein the coordination-insertion catalyst is a metal-ligand complex, wherein the metal-ligand complex is a compound of the formula

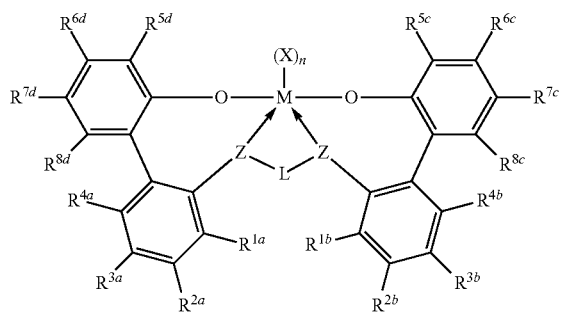

wherein M is titanium, zirconium, or hafnium, each independently being in a formal oxidation state of +2, +3, or +4;
n is an integer of from 0 to 3, wherein when n is 0, X is absent;
each X independently is a monodentate ligand that is neutral, monoanionic, or dianionic, or two X are taken together to form a bidentate ligand that is neutral, monoanionic, or dianionic;
X and n are selected such that the metal-ligand complex of formula (I) is, overall, neutral;
each Z is independently O, S, N($C_1$-$C_{40}$)hydrocarbyl, or P($C_1$-$C_{40}$)hydrocarbyl;
L is ($C_1$-$C_{40}$)hydrocarbylene or ($C_1$-$C_{40}$)heterohydrocarbylene, wherein the ($C_1$-$C_{40}$)-hydrocarbylene has a portion that comprises a 2-carbon atom linker backbone linking the Z atoms in formula (I) and the ($C_1$-$C_{40}$) heterohydrocarbylene has a portion that comprises a 2-atom atom linker backbone linking the Z atoms in formula (I), wherein each atom of the 2-atom linker of the ($C_1$-$C_{40}$)-heterohydrocarbylene independently is a carbon atom or a heteroatom, wherein each heteroatom independently is O, S, S(O), S(O)$_2$, Si($R^C$)$_2$, Ge($R^C$)$_2$, P($R^P$), or N($R^N$), wherein independently each $R^C$ is unsubstituted ($C_1$-$C_{18}$)hydrocarbyl or the two $R^C$ are taken together to form a ($C_2$-$C_{19}$)alkylene, each $R^P$ is unsubstituted ($C_1$-$C_{18}$)hydrocarbyl; and each $R^N$ is unsubstituted ($C_1$-$C_{18}$)hydrocarbyl, a hydrogen atom or absent; $R^{1a}$, $R^{2a}$, $R^{1b}$, and $R^{2b}$ independently is a hydrogen, ($C_1$-$C_{40}$)hydrocarbyl, ($C_1$-$C_{40}$)-heterohydrocarbyl, N($R^N$)$_2$, NO$_2$, OR$^C$, SR$^C$, Si($R^C$)$_3$, Ge($R^C$)$_3$, CN, CF$_3$, F$_3$CO, halogen atom; and each of the others of $R^{1a}$, $R^{2a}$, $R^{1b}$, and $R^{2b}$ independently is a hydrogen, ($C_1$-$C_{40}$)hydrocarbyl, ($C_1$-$C_{40}$)-heterohydrocarbyl, N($R^N$)$_2$, NO$_2$, OR$^C$, SR$^C$, Si($R^C$)$_3$, CN, CF$_3$, F$_3$CO or halogen atom; each of $R^{3a}$, $R^{4a}$, $R^{3b}$, $R^{4b}$, $R^{6c}$, $R^{7c}$, $R^{8c}$, $R^{6d}$, $R^{7d}$, and $R^{8d}$ independently is a hydrogen atom; ($C_1$-$C_{40}$)hydrocarbyl; ($C_1$-$C_{40}$)-heterohydrocarbyl; Si($R^C$)$_3$, Ge($R^C$)$_3$, P($R^P$)$_2$, N($R^N$)$_2$, OR$^C$, SR$^C$, NO$_2$, CN, CF$_3$, RCS(O)—, RCS(O)$_2$—, (RC)$_2$C=N—, RCC(O)O—, RCOC(O)—, RCC(O)N(R)—, (RC)2NC(O)— or halogen atom;
each of $R^{5c}$ and $R^{5d}$ is independently a ($C_6$-$C_{40}$)aryl or ($C_1$-$C_{40}$)heteroaryl;

each of the aforementioned aryl, heteroaryl, hydrocarbyl, heterohydrocarbyl, hydrocarbylene, and heterohydrocarbylene groups is independently unsubstituted or substituted with 1 to 5 more substituents $R^S$; and each $R^S$ is independently a halogen atom, polyfluoro substitution, perfluoro substitution, unsubstituted ($C_1$-$C_{18}$)alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, or two of the $R^S$ are taken together to form an unsubstituted ($C_1$-$C_{18}$)alkylene, wherein each R independently is an unsubstituted ($C_1$-$C_{18}$)alkyl;

under conditions such that at least one oligomer product is formed,
(2) fractionating the oligomer product to produce a fractionated oligomer product, such that the average carbon number of the fractionated oligomer product is 20 or greater; and
(3) hydrogenating the fractionated oligomer product to form the lubricant product.

2. A process according to claim 1, wherein the co-monomer is selected from the group consisting of propylene, 1-butene, 1-hexene, and 1-octene.

3. A process according to claim 1, wherein the at least one olefin and at least one coordination-insertion catalyst are combined in a batch or semi-batch reactor.

4. A process according to claim 1, wherein the at least one olefin and at least one coordination-insertion catalyst are combined in a continuous or semi-continuous reactor system.

5. The process according to claim 1, wherein the coordination-insertion catalyst is selected from the group consisting of

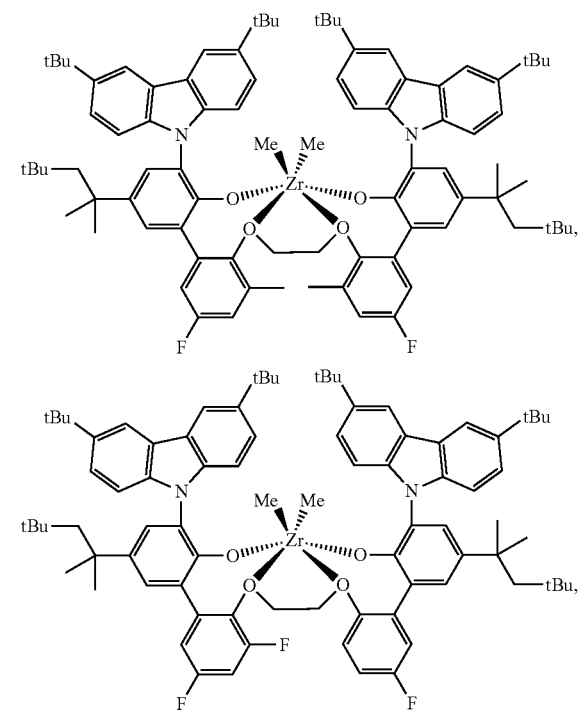

-continued

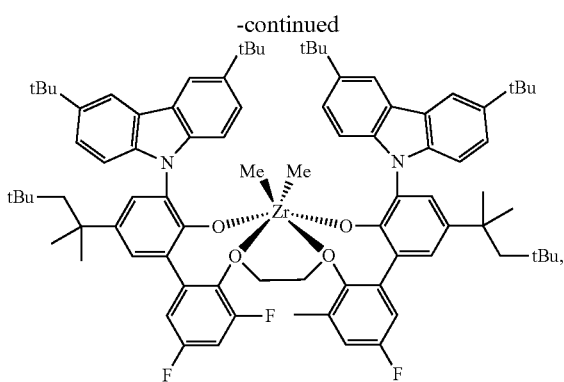

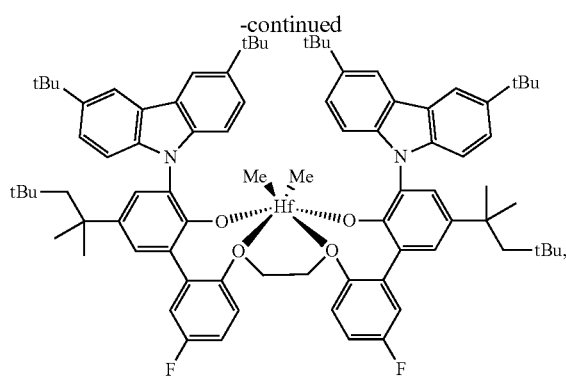

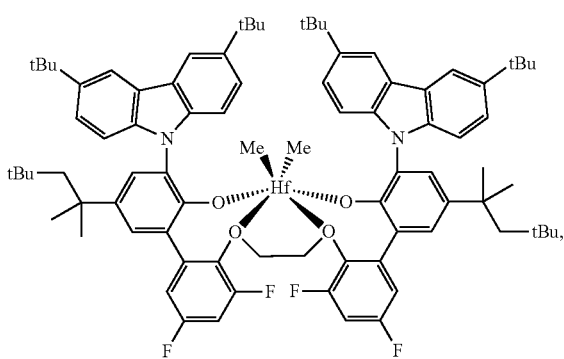

and combinations thereof.

6. A process according to claim 1, wherein the oligomer product comprises a main carbon chain with an average of more than one methine branch carbon per molecule.

7. A process according to claim 1, wherein the lubricant product is a saturated hydrocarbon.

8. A process for preparing a lubricant product comprising:
(1) combining ethylene and at least one coordination-insertion catalyst selected from the group consisting of

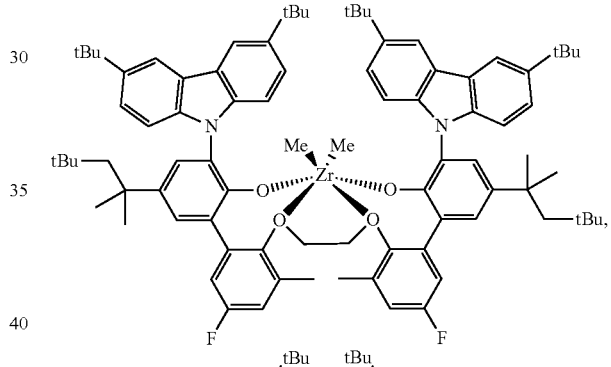

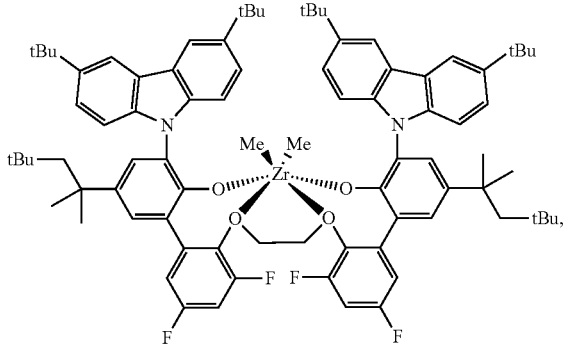

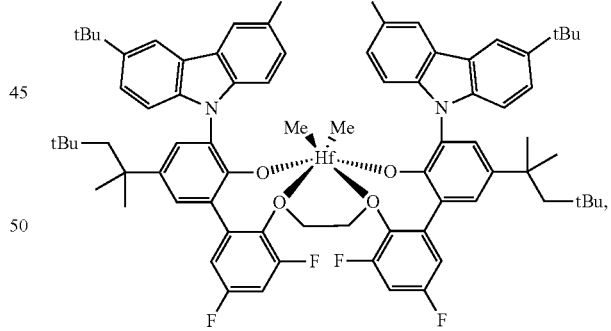

and combinations thereof;
(2) fractionating the oligomer product to produce a fractionated oligomer product, such that the average carbon number of the fractionated oligomer product is 20 or greater; and
(3) hydrogenating the fractionated oligomer product to form the lubricant product.

9. A process for preparing a lubricant product comprising:
(1) combining ethylene, 1-octene, and at least one coordination-insertion catalyst selected from the group consisting of

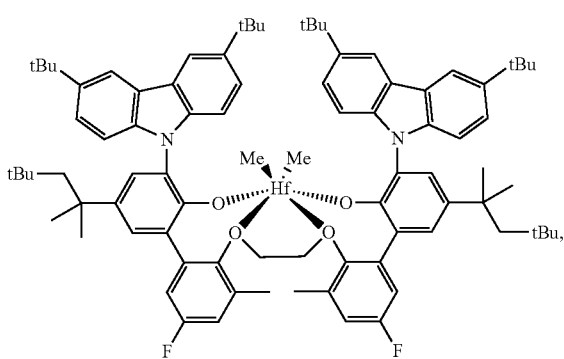

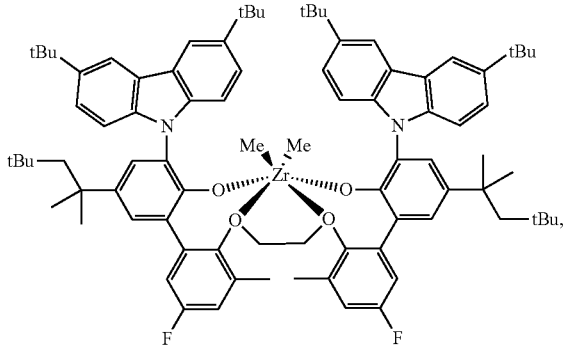

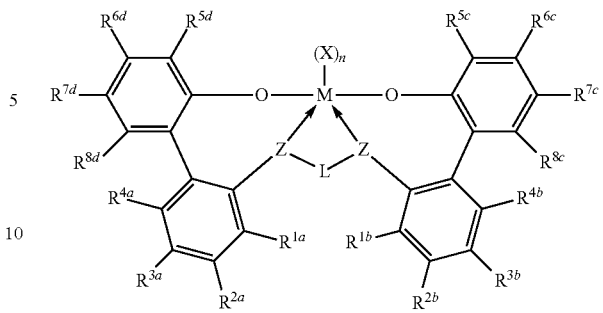

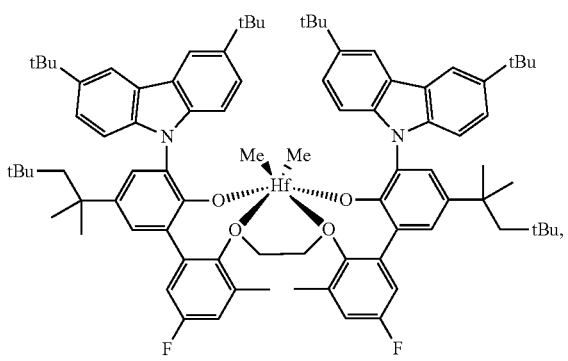

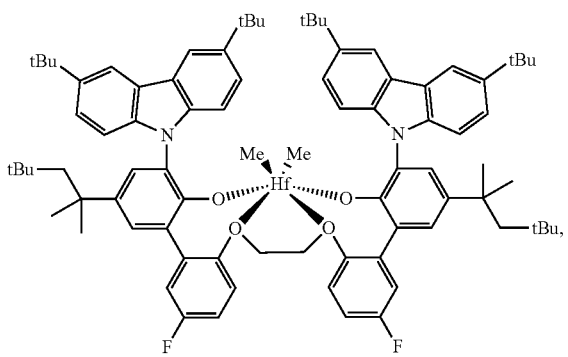

and combinations thereof;

(2) fractionating the oligomer product to produce a fractionated oligomer product, such that the average carbon number of the fractionated oligomer product is 20 or greater; and (3) hydrogenating the fractionated oligomer product to form the lubricant product.

10. A process for preparing a lubricant product comprising:

(1) combining at least one olefin and at least one coordination-insertion catalyst, wherein the at least one olefin is ethylene, and wherein the coordination-insertion catalyst is a metal-ligand complex, wherein the metal-ligand complex is a compound of the formula wherein M is titanium, zirconium, or hafnium, each independently being in a formal oxidation state of +2, +3, or +4;

n is an integer of from 0 to 3, wherein when n is 0, X is absent;

each X independently is a monodentate ligand that is neutral, monoanionic, or dianionic, or two X are taken together to form a bidentate ligand that is neutral, monoanionic, or dianionic;

X and n are selected such that the metal-ligand complex of formula (I) is, overall, neutral;

each Z is independently O, S, N($C_1$-$C_{40}$)hydrocarbyl, or P($C_1$-$C_{40}$)hydrocarbyl;

L is ($C_1$-$C_{40}$)hydrocarbylene or ($C_1$-$C_{40}$)heterohydrocarbylene, wherein the ($C_1$-$C_{40}$)-hydrocarbylene has a portion that comprises a 2-carbon atom linker backbone linking the Z atoms in formula (I) and the ($C_1$-$C_{40}$) heterohydrocarbylene has a portion that comprises a 2-atom atom linker backbone linking the Z atoms in formula (I), wherein each atom of the 2-atom linker of the ($C_1$-$C_{40}$)-heterohydrocarbylene independently is a carbon atom or a heteroatom, wherein each heteroatom independently is O, S, S(O), S(O)$_2$, Si($R^C$)$_2$, Ge($R^C$)$_2$, P($R^P$), or N($R^N$), wherein independently each $R^C$ is unsubstituted ($C_1$-$C_{18}$)hydrocarbyl or the two $R^C$ are taken together to form a ($C_2$-$C_{19}$)alkylene, each $R^P$ is unsubstituted ($C_1$-$C_{18}$)hydrocarbyl; and each $R^N$ is unsubstituted ($C_1$-$C_{18}$)hydrocarbyl, a hydrogen atom or absent; $R^{1a}R^{2a}$, $R^{1b}$, and $R^{2b}$ independently is a hydrogen, ($C_1$-$C_{40}$)hydrocarbyl, ($C_1$-$C_{40}$)-heterohydrocarbyl, N($R^N$)$_2$, NO$_2$, OR$^C$, SR$^C$, Si($R^C$)$_3$, Ge($R^C$)$_3$, CN, CF$_3$, F$_3$CO, halogen atom; and each of the others of $R^{1a}$, $R^{2a}$, $R^{1b}$, and $R^{2b}$ independently is a hydrogen, ($C_1$-$C_{40}$)hydrocarbyl, ($C_1$-$C_{40}$)-heterohydrocarbyl, N($R^N$)$_2$, NO$_2$, OR$^C$, SR$^C$, Si($R^C$)$_3$, CN, CF$_3$, F$_3$CO or halogen atom; each of $R^{3a}$, $R^{4a}$, $R^{3b}$, $R^{4b}$, $R^{6c}$, $R^{7c}$, $R^{8c}$, $R^{6d}$, $R^{7d}$, and $R^{8d}$ independently is a hydrogen atom; ($C_1$-$C_{40}$)hydrocarbyl; ($C_1$-$C_{40}$)-heterohydrocarbyl; Si($R^C$)$_3$, Ge($R^C$)$_3$, P($R^P$)$_2$, N($R^N$)$_2$, OR$^C$, SR$^C$, NO$_2$, CN, CF$_3$, RCS(O)—, RCS(O)$_2$—, (RC)$_2$C═N—, RCC(O)O—, RCOC(O)—, RCC(O)N(R)—, (RC)2NC(O)— or halogen atom;

each of $R^{5c}$ and $R^{5d}$ is independently a ($C_6$-$C_{40}$)aryl or ($C_1$-$C_{40}$)heteroaryl;

each of the aforementioned aryl, heteroaryl, hydrocarbyl, heterohydrocarbyl, hydrocarbylene, and heterohydrocarbylene groups is independently unsubstituted or substituted with 1 to 5 more substituents $R^S$; and each $R^S$ is independently a halogen atom, polyfluoro substitution, perfluoro substitution, unsubstituted ($C_1$-$C_{18}$)alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C═N—, NC—, RC(O)O—, ROC (O)—, RC(O)N(R)—, or R$_2$NC(O)—, or two of the R$^S$ are taken together to form an unsubstituted (C$_1$-C$_{18}$) alkylene, wherein each R independently is an unsubstituted (C$_1$-C$_{18}$)alkyl;

under conditions such that at least one oligomer product is formed, (2) fractionating the oligomer product to produce a fractionated oligomer product, such that the average carbon number of the fractionated oligomer product is 20 or greater; and (3) hydrogenating the fractionated oligomer product to form the lubricant product.

11. A process according to claim 10, wherein t metal-ligand complex is a compound of the formula

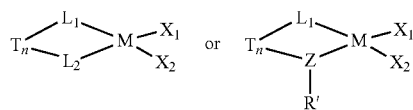

wherein M is the metal center, and is a Group 4 metal selected from titanium zirconium or hafnium;

T is an optional bridging group which, if present, is selected from dialkylsilyl, dialkylmethyl, ethylenyl (—CH$_2$—CH$_2$—) or hydrocarbylethylenyl wherein one, two, three or four of the hydrogen atoms in ethylenyl are substituted by hydrocarbyl, where hydrocarbyl can be independently C$_1$ to C$_{16}$ alkyl or phenyl, tolyl, or xylyl, and when T is present, the catalyst represented can be in a racemic or a meso form;

L$_1$ and L$_2$ are the same or different cyclopentadienyl, indenyl, tetrahydroindenyl or fluorenyl rings, optionally substituted, that are each bonded to M, or L$_1$ and L$_2$ are the same or different cyclopentadienyl, indenyl, tetrahydroindenyl or fluorenyl, which are optionally substituted, in which any two adjacent R groups on these rings are optionally joined to form a substituted or unsubstituted, saturated, partially unsaturated, or aromatic cyclic or polycyclic substituent;

Z is nitrogen, oxygen or phosphorus;

R' is a cyclic linear or branched C$_1$ to C$_{40}$ alkyl or substituted alkyl group; and X$_1$ and X$_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from 3 to 20 carbon atoms; or both together can be an olefin, diolefin or aryne ligand.

* * * * *